United States Patent
Duan et al.

(10) Patent No.: US 12,128,893 B2
(45) Date of Patent: Oct. 29, 2024

(54) INTERVENTION-BASED SHARED CONTROL METHOD AND APPARATUS IN FORWARD COLLISION AVOIDANCE SCENARIO OF AUTONOMOUS VEHICLE

(71) Applicant: University of Science and Technology Beijing, Beijing (CN)

(72) Inventors: Jingliang Duan, Beijing (CN); Liming Xiao, Beijing (CN); Junjie Zhao, Beijing (CN); Guangyuan Yu, Beijing (CN); Xuan Li, Beijing (CN); Chen Huang, Beijing (CN); Fei Ma, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/396,745

(22) Filed: Dec. 27, 2023

(65) Prior Publication Data
US 2024/0253621 A1    Aug. 1, 2024

(30) Foreign Application Priority Data
Jan. 9, 2023    (CN) .......................... 202310029817.0

(51) Int. Cl.
*B60W 30/095*    (2012.01)
*B60W 60/00*    (2020.01)

(52) U.S. Cl.
CPC .... *B60W 30/0956* (2013.01); *B60W 60/0015* (2020.02); *B60W 2540/18* (2013.01); *B60W 2556/10* (2020.02)

(58) Field of Classification Search
CPC .................. B60W 30/0953; B60W 30/0956
See application file for complete search history.

(56) References Cited

U.S. PATENT DOCUMENTS

| | | | |
|---|---|---|---|
| 2016/0059855 A1 | 3/2016 | Rebhan et al. | |
| 2018/0284785 A1 | 10/2018 | Berntorp et al. | |
| 2020/0406969 A1* | 12/2020 | Ersal | B60W 10/184 |
| 2022/0032952 A1* | 2/2022 | Lienke | B60W 60/0011 |
| 2023/0084578 A1* | 3/2023 | Sadeghi | B60W 60/0011 |
| | | | 701/23 |
| 2023/0182775 A1 | 6/2023 | Beaurepaire et al. | |

FOREIGN PATENT DOCUMENTS

| | | |
|---|---|---|
| CN | 112109704 A | 12/2020 |
| CN | 115534938 A | 12/2022 |

* cited by examiner

*Primary Examiner* — Imran K Mustafa
(74) *Attorney, Agent, or Firm* — True Shepherd LLC; Andrew C. Cheng

(57) ABSTRACT

An intervention-based shared control method and apparatus in forward collision avoidance scenario of autonomous vehicle includes: acquiring vehicle state data of the autonomous vehicle and inputting the vehicle state data into a constructed forward collision avoidance control model to obtain an optimal nominal collision avoidance trajectory of the autonomous vehicle; and acquiring steering input data of a driver in controlling the autonomous vehicle, and obtaining the shared control method in the forward collision avoidance scenario of the autonomous vehicle. The present disclosure proposes a vehicle model decoupling method for control solution and risk prediction in a high-velocity forward collision avoidance scenario.

6 Claims, 5 Drawing Sheets

INTERVENTION-BASED SHARED CONTROL METHOD AND APPARATUS IN FORWARD COLLISION AVOIDANCE SCENARIO OF AUTONOMOUS VEHICLE

CROSS-REFERENCE TO RELATED APPLICATIONS

This application claims priority to Chinese Patent Application No. 202310029817.0 with a filing date of Jan. 9, 2023. The content of the aforementioned application, including any intervening amendments thereto, is incorporated herein by reference.

TECHNICAL FIELD

The present disclosure relates to the field of control technologies for autonomous vehicles, and in particular, relates to an intervention-based shared control method and apparatus in a forward collision avoidance scenario of an autonomous vehicle.

BACKGROUND

Intelligent control technologies are the core embodiment of intelligent automobiles. Shared control based on model predictive control in forward collision avoidance scenario fully considers dynamic characteristics of vehicles and predicts vehicle states accurately, which is the mainstream control method at present. The existing shared control collision avoidance intervention policies in both industry and academia follow the minimum intervention principle. That is, when the system considers that the driver's control will not violate the safety constraints, the modification of the driver's input will be minimized to reduce the intrusion of the system on the driver. Where the system can accurately model and predict the vehicle dynamics and driver's behavior, the minimum intervention principle is feasible. However, in practices, it is inevitable that there will be model mismatch problems. In this case, where the system makes an "optimistic" prediction on vehicle operation and driver's behavior, the vehicle will break through the safety constraints preset by the system. Further, the existing policies are all based on a vehicle dynamics model for risk assessment and control solution. Where a linear vehicle dynamics model is used in the system, although the optimal solution efficiency of the model predictive control is ensured, the prediction of the vehicle state may not be accurate enough, resulting in risk assessment distortion. Where the nonlinear vehicle dynamics model is used in the system, although the risk assessment of vehicle state prediction is more accurate, the efficiency of optimal solution of model predictive control may be very slow and difficult for practice.

SUMMARY

The present disclosure is intended to solve the problem of model mismatch in the practice of the existing shared control collision avoidance intervention policies using a minimum intervention principle. At the same time, the existing systems use a linear vehicle dynamics model, which leads to the problem that prediction of a vehicle state may not be accurate enough, thereby resulting in distortion of risk assessment. Using a nonlinear vehicle dynamics model, there is a problem that efficiency of an optimal solution of model predictive control may be very slow and difficult to be practically applied. Therefore, the present disclosure is proposed.

To solve the above technical problem, the present disclosure provides the following technical solutions.

In one aspect, the present disclosure provides an intervention-based shared control method in a forward collision avoidance scenario of an autonomous vehicle. The method is applicable to an electronic device, and includes:

S1, acquiring vehicle state data of the autonomous vehicle;

S2, inputting the vehicle state data into a constructed forward collision avoidance control model based on a virtual collision avoidance control algorithm to obtain an optimal nominal collision avoidance trajectory of the autonomous vehicle;

S3, acquiring steering input data of a driver in controlling the autonomous vehicle; and S4, obtaining the shared control method in the forward collision avoidance scenario of the autonomous vehicle based on the optimal nominal collision avoidance trajectory, the steering input data, and the virtual collision avoidance control algorithm.

Optionally, constructing the forward collision avoidance control model based on the virtual collision avoidance control algorithm in S2 includes:

S21, acquiring history experience data in forward collision avoidance scenarios, and establishing the collision avoidance scenario of the autonomous vehicle based on the history experience data;

S22, generating, by sampling, a plurality of candidate nominal collision avoidance trajectories based on the forward collision avoidance scenario of the autonomous vehicle;

S23, generating an optimal control sequence for each of the plurality of candidate nominal collision avoidance trajectories;

S24, performing vehicle state trajectory prediction on the optimal control sequence using a nonlinear vehicle dynamics model to obtain a vehicle state trajectory; and S25, performing risk assessment on the vehicle state trajectory using a risk assessment algorithm to obtain the optimal nominal collision avoidance trajectory of the autonomous vehicle.

Optionally, generating, by sampling, the plurality of candidate nominal collision avoidance trajectories based on the forward collision avoidance scenario of the autonomous vehicle in S22 includes:

S221, using a collision avoidance completion time in the forward collision avoidance scenario of the autonomous vehicle as a parameter;

S222, sampling the parameter to obtain a sampling result; and

S223, generating the plurality of candidate nominal collision avoidance trajectories based on the sampling result and a numerical optimization method.

Optionally, generate the optimal control sequence for each of the plurality of candidate nominal collision avoidance trajectories in S23 includes;

generating the optimal control sequence for each of the plurality of candidate nominal collision avoidance trajectories based on predetermined safety constraints and the virtual collision avoidance control algorithm.

Optionally, the predetermined safety constraints include a collision safety constraint and a stability safety constraint.

Optionally, performing the vehicle state trajectory prediction on the optimal control sequence using the nonlinear vehicle dynamics model to obtain the vehicle state trajectory in S24 includes:

S241, constructing a nonlinear tire model, wherein the nonlinear tire model is used to describe a tire cornering characteristic of the autonomous vehicle;

S242, constructing a nonlinear vehicle dynamics equation, wherein the nonlinear vehicle dynamics equation is used to describe dynamics of the autonomous vehicle;

S243, obtaining the nonlinear vehicle dynamics model based on the nonlinear tire model, the nonlinear vehicle dynamics equation, and a tire cornering angle estimation formula; and S244, discretizing the nonlinear vehicle dynamics model using four-order Runge-Kutta method, and performing the vehicle state trajectory prediction on the optimal control sequence to obtain a vehicle state trajectory corresponding to each of the plurality of candidate nominal collision avoidance trajectories.

Optionally, obtaining the shared control method in the forward collision avoidance scenario of the autonomous vehicle based on the optimal nominal collision avoidance trajectory, the steering input data, and the virtual collision avoidance control algorithm in S4 includes:

S41, constructing a forward collision avoidance shared control algorithm based on the optimal nominal collision avoidance trajectory, the steering input data, and the virtual collision avoidance control algorithm;

S42, obtaining an optimal shared control sequence of the optimal nominal collision avoidance trajectory based on the forward collision avoidance shared control algorithm; and S43, obtaining the shared control method in the forward collision avoidance scenario of the autonomous vehicle based on the steering input data, the optimal shared control sequence, and the predetermined safety constraint.

In another aspect, the present disclosure provides an intervention-based shared control apparatus in a forward collision avoidance scenario of an autonomous vehicle. The apparatus is applied in performing an intervention-based shared control method in a forward collision avoidance scenario of an autonomous vehicle. The apparatus includes:

a vehicle state acquisition module, configured to acquire vehicle state data of the autonomous vehicle;

an input module, configured to input the vehicle state data into a constructed forward collision avoidance control model based on a virtual collision avoidance control algorithm to obtain an optimal nominal collision avoidance trajectory of the autonomous vehicle;

a steering input acquisition module, configured to acquire steering input data of a driver in controlling the autonomous vehicle; and an output module, configured to obtain the shared control method in the forward collision avoidance scenario of the autonomous vehicle based on the optimal nominal collision avoidance trajectory, the steering input data, and the virtual collision avoidance control algorithm.

Optionally, the input module is further configured to:
acquire history experience data in forward collision avoidance scenarios, and establish the forward collision avoidance scenario of the autonomous vehicle based on the history experience data;

generate, by sampling, a plurality of candidate nominal collision avoidance trajectories based on the forward collision avoidance scenario of the autonomous vehicle;

generate an optimal control sequence for each of the plurality of candidate nominal collision avoidance trajectories;

perform vehicle state trajectory prediction on the optimal control sequence using a nonlinear vehicle dynamics model to obtain a vehicle state trajectory; and perform risk assessment on the vehicle state trajectory using a risk assessment algorithm to obtain the optimal nominal collision avoidance trajectory of the autonomous vehicle.

Optionally, the input module is further configured to:
use a collision avoidance completion time in the forward collision avoidance scenario of the autonomous vehicle as a parameter;

sample the parameter to obtain a sampling result; and generate the plurality of candidate nominal collision avoidance trajectories based on the sampling result and a numerical optimization method.

Optionally, the input module is further configured to:
generate the optimal control sequence for each of the plurality of candidate nominal collision avoidance trajectories based on predetermined safety constraints and the virtual collision avoidance control algorithm.

Optionally, the predetermined safety constraints include a collision safety constraint and a stability safety constraint.

Optionally, the input module is further configured to:
construct a nonlinear tire model, wherein the nonlinear tire model is used to describe a tire cornering characteristic of the autonomous vehicle;

construct a nonlinear vehicle dynamics equation, wherein the nonlinear vehicle dynamics equation is used to describe dynamics of the autonomous vehicle;

obtain the nonlinear vehicle dynamics model based on the nonlinear tire model, the nonlinear vehicle dynamics equation, and a tire cornering angle estimation formula; and discretize the nonlinear vehicle dynamics model using four-order Runge-Kutta method, and perform the vehicle state trajectory prediction on the optimal control sequence to obtain a vehicle state trajectory corresponding to each of the plurality of candidate nominal collision avoidance trajectories.

Optionally, the output module is further configured to:
construct a forward collision avoidance shared control algorithm based on the optimal nominal collision avoidance trajectory, the steering input data, and the virtual collision avoidance control algorithm;

obtain an optimal shared control sequence of the optimal nominal collision avoidance trajectory based on the forward collision avoidance shared control algorithm; and obtain the shared control method in the forward collision avoidance scenario of the autonomous vehicle based on the steering input data, the optimal shared control sequence, and the predetermined safety constraint.

In still another aspect, the present disclosure further provides an electronic device. The electronic device includes a processor and a memory. The memory stores at least one instruction. The processor, when loading and executing the at least one instruction, is caused to perform the above method.

In yet still another aspect, the present disclosure further provides a computer-readable storage medium The computer-readable storage medium stores at least one instruction. The at least one instruction, when loaded and executed by a processor, causes the processor to perform the above method.

The technical solutions according to the present disclosure achieve at least the following beneficial effects:

The intervention-based shared control method in the forward collision avoidance scenario of the autonomous vehicle provides a comprehensive risk assessment method and a collision avoidance intervention policy in a high-velocity forward collision avoidance scenario. With respect to shared autonomy high-velocity forward collision avoidance scenarios, the solutions according to the present disclosure make a breakthrough out of the minimum intervention principle, and introduce the nominal collision avoidance reference trajectories, such that the collision risks of the vehicle during collision avoidance are further reduced. A vehicle model decoupling method integrating control solution and risk prediction is provided, such that solution efficiency of linear models and prediction accuracy of non-linear models are both considered. The nominal collision avoidance trajectory optimization and the comprehensive risk assessment are unified under the model predictive control framework, such that advance risk assessment in the forward collision avoidance scenario is implemented, and judgment issues related to critical collision avoidance intervention chances are addressed. In summary, the present disclosure has constructed the collision avoidance intervention control policy that implicitly representing the driver control right, and provides double safety insurance "collision-loss of stability" in the high-velocity forward collision avoidance scenario for shared autonomy.

BRIEF DESCRIPTION OF THE DRAWINGS

For clearer descriptions of the technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

For clearer descriptions of the objectives, technical solutions, and advantages of the present disclosure clearer, the present disclosure is described in detail with reference to accompanying drawings and specific embodiments.

Figure 1:
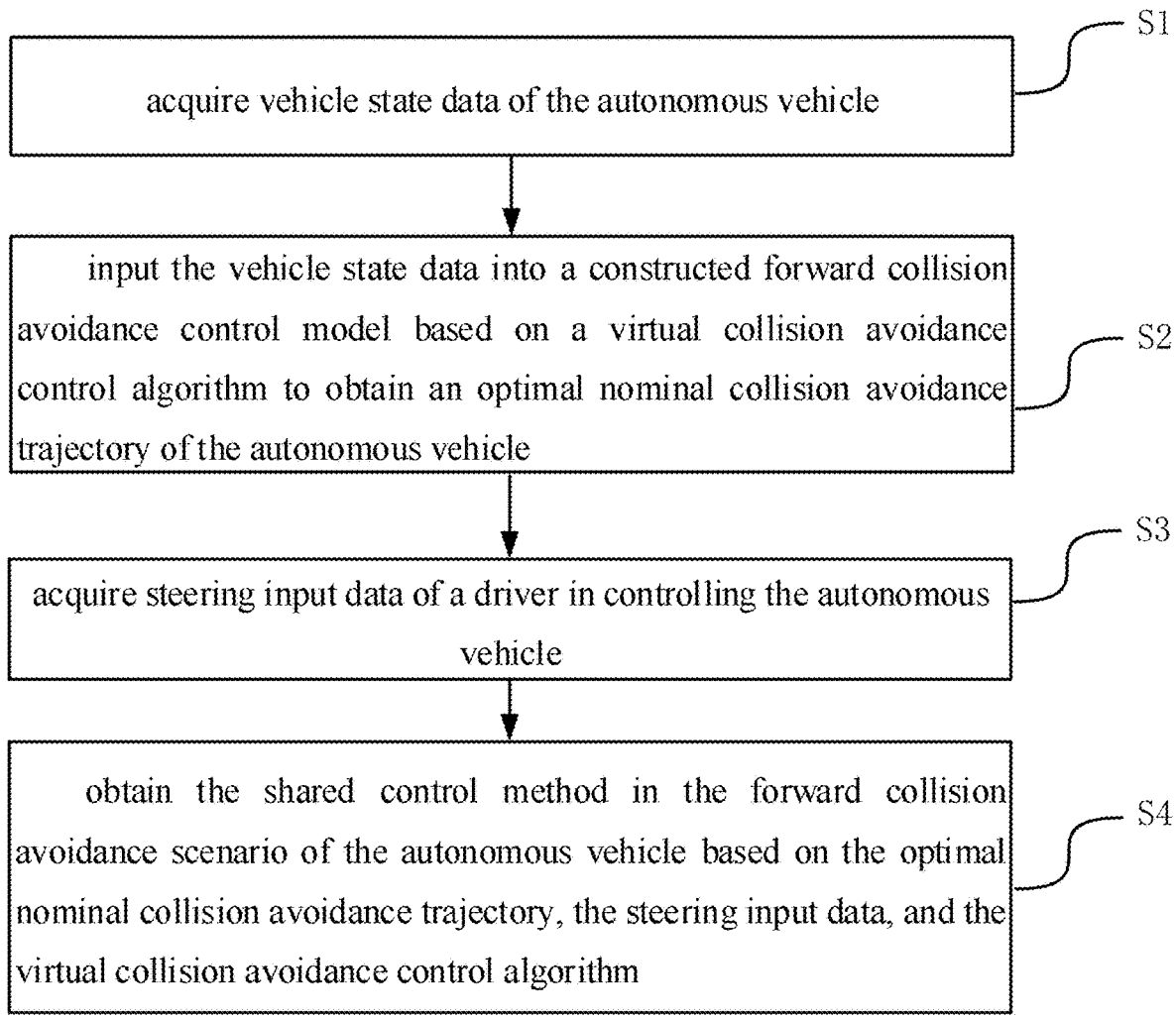
FIG. 1 is a schematic flowchart of an intervention-based shared control method in a forward collision avoidance scenario of an autonomous vehicle according to an embodiment of the present disclosure.

As illustrated in FIG. 1, an embodiment of the present disclosure provides an intervention-based shared control method in a forward collision avoidance scenario of an autonomous vehicle. The method is applicable to an electronic device. FIG. 1 is a schematic flowchart of the intervention-based shared control method in the forward collision avoidance scenario of the autonomous vehicle. The method may include the following steps.

In S1, vehicle state data of the autonomous vehicle is acquired.

Figure 2:
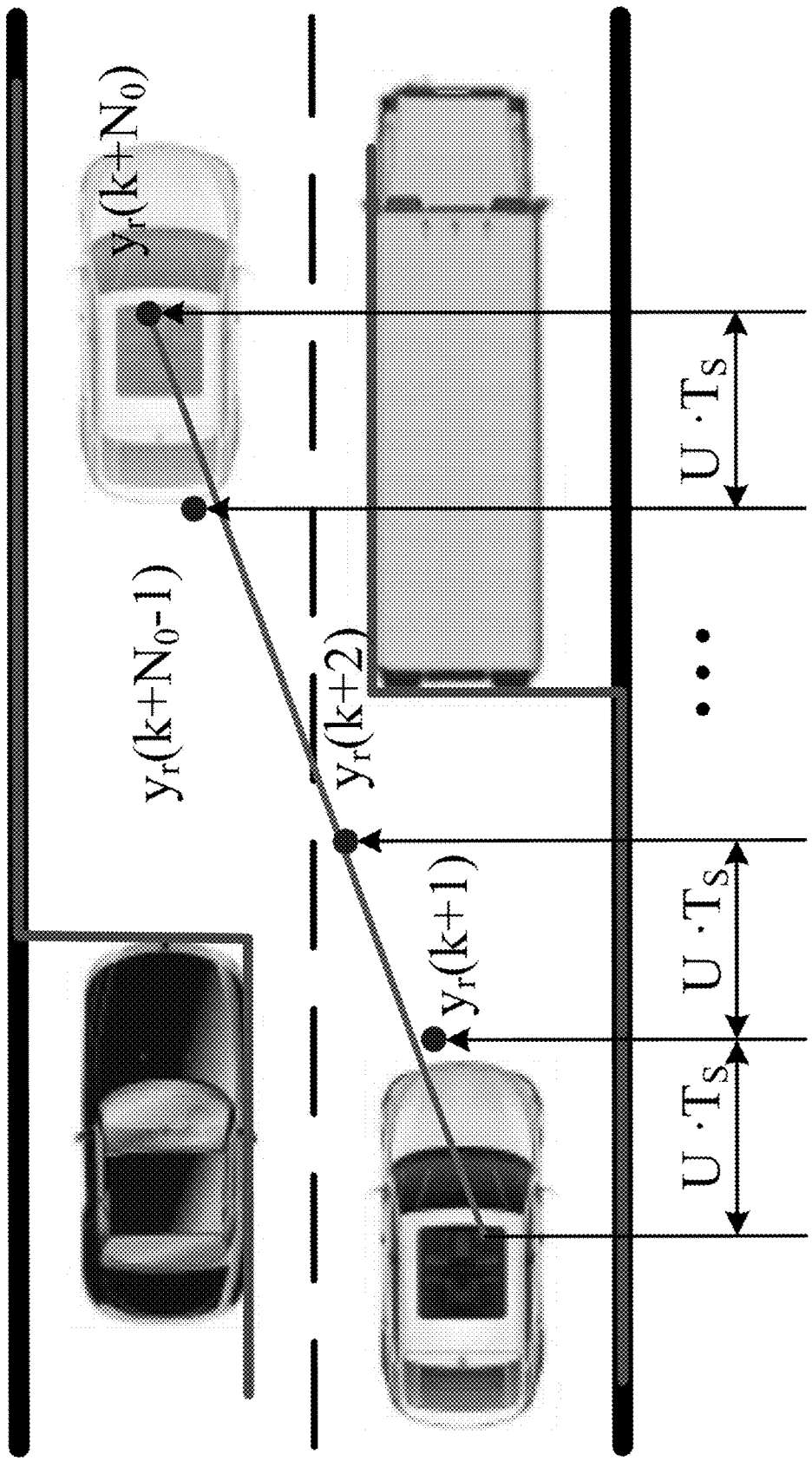
FIG. 2 is a schematic diagram of a forward collision avoidance scenario and planning of nominal collision avoidance trajectories according to an embodiment of the present disclosure.

In a possible embodiment, the forward collision avoidance scenario according to the present disclosure is as illustrated in FIG. 2. In the event of an emergency (an emergency brake) ahead at an instant, it is late for a driver to avoid collision by braking, and therefore the vehicle has to change to the left lane to avoid the obstacle ahead.

In S2, the vehicle state data is input into a constructed forward collision avoidance control model based on a virtual collision avoidance control algorithm to obtain an optimal nominal collision avoidance trajectory of the autonomous vehicle.

Optionally, constructing the forward collision avoidance control model based on the virtual collision avoidance control algorithm in S2 may include the following steps S21 to S25.

In S21, history experience data in forward collision avoidance scenarios is acquired, and the forward collision avoidance scenario of the autonomous vehicle is established based on the history experience data.

Figure 3:
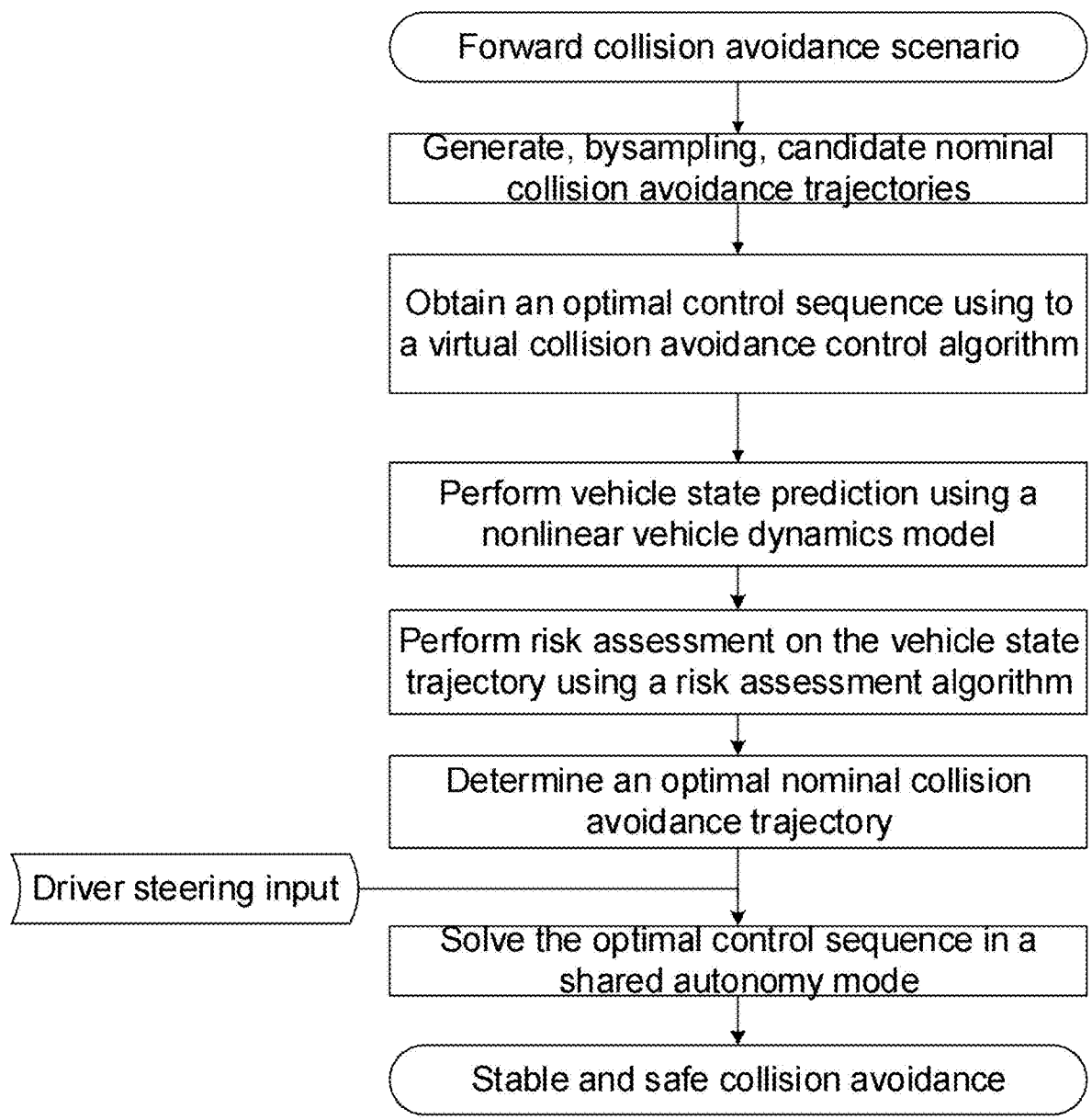
FIG. 3 is an overall framework and a flowchart of according to an embodiment of the present disclosure.

In an optional embodiment, an approximate forward collision avoidance scenario of the autonomous vehicle may be established based on the history experience data in the forward collision avoidance scenarios. The overall framework and flowchart are as illustrated in FIG. 3.

In S22, a collision avoidance completion time in the forward collision avoidance scenario of the autonomous vehicle is used as a parameter, the parameter is sampled to obtain a sampling result, and the plurality of candidate nominal collision avoidance trajectories are generated based on the sampling result and a numerical optimization method.

In an optional embodiment, sampling is performed using the collision complete time as the parameter, and the candidate nominal collision avoidance trajectories are generated based on the sampling and using the numerical optimization method.

Specifically, with respect to nominal collision avoidance trajectory planning in the forward collision avoidance scenario as illustrated in FIG. 2, in the course of lane-change collision avoidance, the vehicle is not allowed to cross a horizontal safety boundary (an upper boundary is marked as $y_{upp}$, and a lower boundary is marked as $y_{low}$) to avoid collision. At each instant k, the system perform equal-interval sampling towards a forward direction based on a current vehicle state x(k) and a current vehicle velocity U and a control sampling period $T_s$, and plans a series expected lateral displacements $\{y_r(k+1)\}_{i=1,\ldots,N_o}$ to be reached in the future as the nominal collision avoidance trajectories, wherein $N_o$ represents a step for lane-change collision avoidance, $N_o T_s$ represents time for land change for collision avoidance, and different $N_o$s correspond to different candidate nominal collision avoidance trajectories. In the present disclosure, the value of each of trajectory points is considered as an optimization variable, and all the trajectory points are solved at one time by optimizing a target function, that is, by the candidate nominal collision avoidance trajectories are generated by direct numerical optimization (formula 1):

$$\min_{y_r(k)} w_a \sum_{i=1}^{N_o-1} \frac{y_r(k+i-1) - 2y_r(k+i) + y(k+i+1)}{T_s^2} + \quad (1)$$

$$w_j \sum_{i=1}^{N_o-2} \frac{-y(k+i-1) + 3y(k+i) - 3y(k+i+1) + 3y(k+i+2)}{T_s^3}$$

$$y_r(k+i+1) - y_r(k+i) \geq 0, \; i = 0, \ldots, N_o - 1 \quad (2)$$

$$\frac{y_r(k+i-1) - 2y_r(k+i) + y_r(k+i+1)}{T_s^2} \leq \mu g, \; i = 1, \ldots, N_o \quad (3)$$

$$y_{low}(k+i) + \Delta y_b \leq y(k+i) \leq y_{upp}(k+i) - \Delta y_b, \; i = 1, \ldots, N_o \quad (4)$$

$$y_r(k) = y(k) \quad (5)$$

$$y_r(k + N_o) = \frac{y_{upp}(k+N_o) + y_{low}(k+N_o)}{2} \quad (6)$$

$$y_r(k+1) - y_r(k) = v(k)T_s \quad (7)$$

$$y_r(k + N_o) - y_r(k + N_o - 1) = 0 \quad (8)$$

In formula (1), an accumulated lateral acceleration and an accumulated lateral jerk when the vehicle travels along the trajectories are included, which are measured by weight coefficients $\omega_a$ and $\omega_j$. By the target function, it may be ensured that the optimized trajectories satisfy smoothness requirements. Formula (2) to formula (8) are constraints of formula (1). Constraint (2) is used to ensure that the reference trajectories are in an increasing sequence. In constraint (3), $\mu$ represents a lane adhesion coefficient, and g represents a gravity acceleration constant. The constraint is used to ensure that the lateral acceleration of the vehicle traveling along the trajectories does not exceed a maximum value offered by a road surface. Constraint (4) is used to ensure that no collision occurs when the vehicle travels along the trajectories. In the formula, $\Delta y_b$ represents a buffer area width defined in consideration of the vehicle width (since y represents a lateral displacement of the mass center of the vehicle), $y_{upp}(k+i)$ and $y_{low}(k+i)$ respectively represent upper and lower safety boundaries at a k+i instant (it is assumed in the present disclosure that the system is capable of acquiring safety boundary position information within the step for lane-change collision avoidance). Formula (5) and formula (6) are used to give constraints to a start position and a final position of the vehicle. Constraint (5) indicates that the reference trajectory starts from the current position of the vehicle, and constraint (6) restricts the final position for lane-change collision avoidance to the middle of end upper and lower safety boundaries to ensure that the vehicle is far away from the obstacle when collision avoidance ends. Formula (7) and formula (8) are used to give constraints to a start lateral velocity and a final lateral velocity of the vehicle. Constraint (7) indicates that a start lateral acceleration of the reference trajectory is equal to a current lateral acceleration of the vehicle, and constraint (8) requires that the lateral velocity when collision avoidance ends is zero to ensure that the nominal collision avoidance trajectories and the lane maintain trajectory when collision avoidance ends are in second-order continuation. By sampling the step parameter $N_o$ for collision avoidance, the plurality of candidate nominal collision avoidance trajectories are generated. When $N_o$ is less than a predictive control time domain of the system, the ends of the trajectories are complemented. Hereby, the candidate nominal collision avoidance trajectories $r_A^{(N_o)}(k)$ at the state at the k instant are generated.

In S23, the optimal control sequence for each of the plurality of candidate nominal collision avoidance trajectories is generated based on predetermined safety constraints and the virtual collision avoidance control algorithm.

Optionally, the predetermined safety constraints may include a collision safety constraint and a stability safety constraint.

In an optional embodiment, with respect to each of the candidate nominal collision avoidance trajectories $r_A^{(N_o)}(k)$, under the collision safety constraint and stability safety constraint of the vehicle, an optimal control sequence u(k) is calculated using a virtual collision avoidance control algorithm based on model predictive control.

Further, according to the present disclosure, a control sequence employed by the system for autonomously control collision avoidance of the vehicle with given environmental obstacle position information and nominal collision avoidance trajectories is predicted using the virtual collision avoidance control algorithm. The control sequence is not eventually used for actual collision avoidance control, but is used for risk assessment for the nominal collision avoidance trajectories.

Further, in controlling the vehicle for high-velocity forward collision avoidance, for both the dynamics stability and collision safety of the vehicle, the present disclosure thereby introduces the collision safety constraint (formula 9) and the stability safety constraint (formula 10):

$$y(k) - \Delta y_b \geq y_{low}(k)$$

$$y(k) + \Delta y_b \leq y_{upp}(k) \quad (9)$$

$$-\alpha_{lin} \leq \alpha_f(k) \leq \alpha_{lin}$$

$$-\alpha_{lin} \leq \alpha_r(k) \leq \alpha_{lin} \quad (10)$$

The collision safety constraint (formula 9) at the instant k is marking the upper boundary of a travel region of the vehicle as $y_{upp}$ and marking the lower boundary of the travel region as $y_{low}$, and $\Delta y_b$ represents the buffer area width defined in consideration of the vehicle dimension. In the present disclosure, for effectiveness of the linear vehicle model in the model predictive control to further prevent degradation of the control performance due to model mismatch, a tire cornering angle is constrained into a linear area as the stability safety constraint, a curve of tire characteristics of the tire is known and symmetrical, and in the stability safety constraint (formula 10) of the vehicle at the instant k, $\alpha_{lin}$ represents a linear working area range of the tire cornering angle.

Further, after the collision safety and stability safety constraints of the vehicle are designed, a model predictive virtual collision avoidance control algorithm (formula 11) is applied to a given candidate nominal collision avoidance trajectory:

$$\min_{u(k)} \sum_{i=1}^{N_p^{(0)}} \left\| z(k+i|k) - r_A^{(N_o)}(k+i) \right\|_{Q_A^{(0)}}^2 + \quad (11)$$

$$\sum_{i=0}^{N_c^{(0)}-1} \left\| u(k+i|k) \right\|_{R_A^{(0)}}^2 + \rho_c \varepsilon_c + \rho_s \varepsilon_s$$

$$x(k+i+1|k) = Ax(k+i|k) + Bu(k+i|k), \; i = 0, \ldots, N_p^{(0)} - 1 \quad (12)$$

$$z(k+i|k) = Cx(k+i|k), \; i = 1, \ldots, N_p^{(0)} \quad (13)$$

$$u(k+i|k) = u(k + N_c^{(0)} - 1|k), \; i = N_c^{(0)}, \ldots, N_p^{(0)} - 1 \quad (14)$$

-continued $$x(k|k) = x(k) \quad (15)$$

$$u(k-1|k) = u(k-1) \quad (16)$$

$$-\omega_{max}T_s \le \Delta u(k+i|k) \le \omega_{max}T_s, i = 0, \ldots, N_c^{(0)} - 1 \quad (17)$$

$$y_{low}(k+i) + \Delta y_b - \varepsilon_c \le C_y x(k+i|k) \le \\ y_{upp}(k+i) - \Delta y_b + \varepsilon_c, \le = 1, \ldots, N_p^{(0)} \quad (18)$$

$$-\alpha_{lin} - \varepsilon_s \le \frac{u(k+i|k)}{i_s} - \frac{C_y x(k+i+1|k) + aC_\omega x(k+i+1|k)}{U} \le \\ \alpha_{lin} + \varepsilon_s, i = 0, \ldots, N_p^{(0)} - 1 \quad (19)$$

$$(20)$$

$$-\alpha_{lin} - \varepsilon_s \le -\frac{C_y x(k+i+1|k) - bC_\omega x(k+i+1|k)}{U} \le \alpha_{lin} + \varepsilon_s, \\ i = 0, \ldots, N_p^{(0)} - 1$$

$$\varepsilon_C \ge 0, \varepsilon_s \ge 0 \quad (21)$$

In formula, the superscript (0) represents a critical dangerous working condition, and is used to differentiate from a controller parameter in a lane maintain working condition. In the cost function (formula 11), the first term represents a tracking error of the candidate nominal collision avoidance trajectory, wherein $r_A^{(N_o)}$ represents a candidate nominal collision avoidance trajectory with $N_o$ as a collision avoidance step parameter; the second term is an output adjustment term, and is used to inhibit a control output oscillation; and the third and fourth terms are respectively used to give a penalty on over-stepping degrees against a collision safety envelope and a stability safety envelope in terms of the vehicle state, wherein $\varepsilon_c$ and $\varepsilon_s$ represent slack variables of the over-stepping degrees, and the corresponding weight coefficients are $\rho_c$ and $\rho_s$. Formula (12) and formula (13) represent a vehicle model used when the system carries out collision avoidance, and herein a linear vehicle model of two degrees of freedom. Formula (17) is used to constraint a rate of change of a steering wheel angle in the collision avoidance course, wherein $\omega_{max}$ represents a maximum allowable angular velocity of the steering wheel. Formula (18) represents the collision safety constraint, and herein by adding the slack variable $\varepsilon_c$, a collisionless requirement is represented as a soft constraint form, such that the scenario where the optimization problem has no solution is avoided. Formulas (19) and (20) are stability and safety constraints of the front and rear wheels, respectively, and a slack process is also performed, wherein $C_y=[1\ 0\ 0\ 0]$ is an observation matrix of a lateral velocity of the vehicle and $C_\omega=[0\ 1\ 0\ 0]$ is an observation matrix of a yaw velocity of the vehicle are used. With respect to construction of the model predictive virtual collision avoidance control algorithm, the following points are explained:

(1) At each instant k, quantities that the system needs to make on-line observation through on-vehicle sensors (or quantities indirectly calculated through on-line observation data, and quantities that can be loaded through a cache) include: the current state x(k) of the vehicle, the input u(k−1) of the system at the last instant, the candidate nominal collision avoidance trajectory $R_A^{(N_o)}$ of the system in the prediction time domain, the sum of the upper and lower boundaries $y_{upp}$ and $y_{low}$ of the travel area of the vehicle in the prediction time domain, and the remaining parameters can be stored in advance through off-line calculation.

(2) Slack variables $\varepsilon_c$ and $\varepsilon_s$ are considered optimization variables, and may be jointly optimized with the system input sequence u(k). Where $\varepsilon_c$ and $\varepsilon_s$ can be optimized to zero, it indicates that the vehicle state may not violate the collision and stability safety constraints in the prediction time domain; otherwise, the degree of traverse of the two safety constraints by the vehicle state may be penalized by the weight coefficient $\rho_c$ and $\rho_s$.

In the constraint function, the control input change rate of the system is constrained, but no saturation constraint is made to the absolute value of the control input. This is because it is difficult to achieve an actuator saturation constraint under the control change rate constraint and the output regulator in the cost function. Therefore, from the viewpoint of computational efficiency, no control amount saturation constraint is added.

In summary, in the virtual collision avoidance control algorithm (formula 11), since all the optimization variables have a linear constraint relationship, the cost function therein is a quadratic function of the optimization variables, and the quadratic function problem can be solved quickly by a mature solver, it is easier to meet the real-time requirements in practice.

To this end, the generation of an optimal control sequence u(k) for each of the candidate nominal collision avoidance trajectories $r_A^{(N_o)}(k)$ is completed.

In S24, tire cornering characteristics of the autonomous vehicle are described using a nonlinear tire model, dynamics of the autonomous vehicle are described using a nonlinear vehicle dynamics equation, the nonlinear vehicle dynamics model of the autonomous vehicle is obtained based on the nonlinear tire model, the nonlinear vehicle dynamics equation and the tire cornering angle estimation formula, the nonlinear vehicle dynamics model is discretized using four-order Runge-Kutta method, and perform the vehicle state trajectory prediction on the optimal control sequence to obtain a vehicle state trajectory corresponding to each of the plurality of candidate nominal collision avoidance trajectories.

In an optional embodiment, for the optimal control sequence u(k) output by the virtual collision avoidance predictive control algorithm, the nonlinear vehicle dynamics model is used to predict a vehicle state response, and the vehicle state trajectory corresponding to a candidate nominal collision avoidance trajectory is obtained using the fourth-order Runge-Kutta method.

Specifically, the present disclosure proposes using a nonlinear vehicle model to perform vehicle state trajectory prediction on an optimal control sequence u(k) found by the virtual collision avoidance control algorithm to accurately assess the real risk of a candidate nominal collision avoidance trajectory. The present disclosure uses a Fiala nonlinear tire model (formula 22) to describe the cornering characteristics of the tire for risk assessment:

$$f_{y\#} = \begin{cases} C_\# \tan\alpha_\# \left(1 + \frac{C_\# |\tan\alpha_\#|}{3\mu f_{z\#}} - \frac{C_\#^2 \tan^2\alpha_\#}{27\mu^2 f_{z\#}^2}\right), & |\alpha_\#| \le \alpha_s \\ \mu f_z \text{sgn}(\alpha_\#), & |\alpha_\#| > \alpha_s \end{cases} \quad (22)$$

"#" may take "f" or "r" which respectively represent the front wheel or the rear wheel, $C_\#$ represents a cornering stiffness, $\mu$ represents a road adhesion coefficient, $f_{z\#}$ represents a vertical load on the tire, and $\alpha_s$ represents a tire saturation cornering angle.

Further, the present disclosure recognizes that the steering wheel angle and the vehicle yaw angle also no longer meet the small-angle assumption in a forward collision avoidance scenario, and therefore, the vehicle dynamics are described using a nonlinear system of equations (formula 23):

$$m(\dot{v}+U\omega)=2f_{yf}\cos\delta+2f_{yr}$$

$$I_z\dot{\omega}=2af_{yr}\cos\delta-2bf_{yr}$$

$$\dot{y}=U\sin\psi+v\cos\psi$$

$$\dot{\psi}=\omega \qquad (23)$$

Based on the nonlinear tire model (formula 22) and the nonlinear vehicle dynamics equation (formula 23), by introducing the tire cornering angle estimation formula, the nonlinear vehicle dynamics model (formula 24) may be obtained:

$$\dot{x}(s)=f(x(t),u(t)) \qquad (24)$$

The present disclosure discretizes a nonlinear dynamic model (formula 24) of a vehicle given a control sequence $u(k)=\{u(k+i|k)\}_{i=0,\ldots,N_p^o-1}$ using the four-order Runge-Kutta method, and predicts future states under the given control sequence u(k). Table 1 gives the algorithmic flow of the fourth-order Runge-Kutta method:

TABLE 1

Algorithmic flow of the fourth-order Runge-Kutta method
Algorithm: vehicle state prediction based on four-order Runge-Kutta method Result: Predicted vehicle state trajectories $\{x(k+i|k)\}_{i=0,\ldots,N_p^o-1}$
begin
    i ← 0, x(k|k) ← x(k)
    While i < $N_p^{(o)}$ do
        $h_1 \leftarrow f(x(k+i|k), u(k+i|k))$ $$h_2 \leftarrow f\left(x(k+i|k)+\frac{T_s}{2}h_1, u(k+i|k)\right)$$

$$h_3 \leftarrow f\left(x(k+i|k)+\frac{T_s}{2}h_2, u(k+i|k)\right)$$

$h_4 \leftarrow f(x(k+i|k)+T_s h_3, u(k+i|k))$ $$x(k+i+1) \leftarrow x(k+i|k)+\frac{T_s}{6}(h_1+2h_2+2h_3+h_4)$$

i ← i + 1
end

To this end, the vehicle state trajectory corresponding to the optimal control sequence u(k) of a candidate nominal collision avoidance trajectory is successfully predicted using the nonlinear vehicle dynamics model.

In S25, risk assessment is performed on the vehicle state trajectory using a risk assessment algorithm to obtain the optimal nominal collision avoidance trajectory of the autonomous vehicle.

In an optional embodiment, for the predicted vehicle state trajectory, collision/stability comprehensive risk assessment is performed on the candidate nominal collision avoidance trajectory using a risk assessment algorithm, and an optimal nominal collision avoidance trajectory is selected.

In particular, risks of the vehicle during forward collision avoidance mainly include a risk of collision and a risk of dynamic instability. The risk of collision can be measured by a closest distance of the vehicle from the obstacle, while the risk of dynamic instability can be judged by the extent to which the tire cornering angle exceeds the linear working area. The present disclosure proposes that the risk assessment function performs comprehensive risk assessment on a candidate nominal collision avoidance trajectory of the vehicle (formula 25):

$$\Gamma\left(r_A^{(N_o)}(k)\right):=\Gamma(N_o;k)=w_s\sum_{i=1}^{N}\gamma^{i-1}\binom{g^2(\alpha_f(k+i|k(-\alpha_{lin})+}{g^2(\alpha_r(k+i|k)-\alpha_{lin}}+ \qquad (25)$$

$$w_c\sum_{i=1}^{N}\gamma^{i-1}\binom{g^2(y_{low}(k+i)+\Delta y_b-y(k+i|k))+}{g^2(y(k+i|k)-y_{upp}(k+i)+\Delta y_b)}$$

In formula (25), $\Gamma(r_A^{(N_o)}(k))$ represents a risk evaluation value for a candidate nominal collision avoidance trajectory $r_A^{(N_o)}(k)$, including a risk of instability and a risk of collision, and $w_s$ and $w_c$ are respectively weights of the corresponding risk of instability and the risk of collision, $\gamma$ represents a discount factor, and g represents a cut-off function, which is defined as (formula 26):

$$g(x)=\begin{cases}x, & x\geq 0\\ 0, & x<0\end{cases} \qquad (26)$$

The candidate nominal collision avoidance trajectory with a smallest overall risk may be selected as the optimal nominal collision avoidance trajectory at the current instant (formula 27):

$$r_A(k)=\arg\min_{N_o}\Gamma\left(r_A^{(N_o)}(k)\right) \qquad (27)$$

The risk assessment value $\Gamma(r_A^{(N_o)}(k))$ in the present disclosure, in one aspect, determines when the system is to perform the latest collision avoidance intervention. When the system detects an obstacle ahead while the vehicle is running at a high velocity, comprehensive risk assessment with nominal collision avoidance trajectory optimization is started. Where the driver starts lane-change collision avoidance when the risk assessed by the system is still at a low value, the system selects the optimal nominal collision avoidance trajectory to assist the driver to successfully complete a task of smooth collision avoidance on the basis of identifying the intention of lane-change collision avoidance. Where the risk assessed by the system has reached a predetermined critical value and the driver has not yet made a response action to the obstacle ahead, the system makes active intervene to complete the forward collision avoidance work (the current optimal nominal collision avoidance trajectory is still selected as the collision avoidance reference trajectory), so as to ensure the safety of the vehicle. Further, the risk assessment value of the system is also linked with the driver's control right in the process of man-machine collaborative collision avoidance. Where the driver starts lane-change collision avoidance in advance when the vehicle risk is low, the system may give the driver higher control right in the shared control to reduce the intervention on the operation thereof. Where the vehicle enters the lane-change collision avoidance mode when the risk is high, it is difficult to predict whether the emergency driver can successfully complete the collision avoidance operation. In this case, the system may weaken the control right of the driver in the collaborative collision avoidance to ensure the smooth and smooth collision avoidance process.

To this end, a comprehensive collision/stability risk assessment of the candidate nominal collision avoidance trajectories is completed, and an optimal nominal collision avoidance trajectory is selected, and the selection of the optimal nominal collision avoidance trajectory will also facilitate the implementation of the risk intervention-based shared control policy in step S4 in the present disclosure.

In S3, steering input data of a driver in controlling the autonomous vehicle is acquired.

In an optional embodiment, the driver's steering wheel angle input information may be obtained.

In S4, the shared control method in the forward collision avoidance scenario of the autonomous vehicle is obtained based on the optimal nominal collision avoidance trajectory, the steering input data, and the virtual collision avoidance control algorithm.

Optionally, step S4 may include the following substeps S41 to S43.

In S41, a forward collision avoidance shared control algorithm is constructed based on the optimal nominal collision avoidance trajectory, the steering input data, and the virtual collision avoidance control algorithm.

In S42, an optimal shared control sequence of the optimal nominal collision avoidance trajectory is obtained based on the forward collision avoidance shared control algorithm.

In S43, the shared control method in the forward collision avoidance scenario of the autonomous vehicle is obtained based on the steering input data, the optimal shared control sequence, and the predetermined safety constraint.

In an optional embodiment, the control method is constructed based on the virtual collision avoidance control algorithm, and the driver's steering wheel angle input information is incorporated into the forward collision avoidance shared control to ensure that the driver's control intention is respected to some extent. On the basis of the method, the shared control under the condition of shared autonomy is carried out.

Specifically, based on the consideration that adding a driver model to the predictive control configuration may cause the system to produce an "optimistic" estimation of the vehicle collision avoidance capability, thereby jeopardizing driving safety, and also considering that if a linear weighting is used as the collision avoidance shared control law, the man-machine weight distribution may change frequently with the risk assessment, which may lead to vehicle instability and cause unexpected consequences, the present disclosure implicitly defines the driver's control right in a cost construction function (formula 11), and on this basis, a risk intervention-based forward collision avoidance shared control method is constructed as follows (formula 28):

$$\min_{u(k)} \sum_{i=1}^{N_p^{(0)}} \|z(k+i|k) - r_A(k+i)\|_{Q_A^{(0)}}^2 + \sum_{i=0}^{N_c^{(0)}-1} \|u(k+i|k)\|_{R_A^{(0)}}^2 + \sum_{i=0}^{N_c^{(0)}-1} \|u(k+i|k) - u_D(k)\|_{R_D^{(0)}}^2 + \rho_c \varepsilon_c + \rho_s \varepsilon_s \quad (28)$$

The symbol definitions in formula (28) are consistent with the symbol definitions in the virtual collision avoidance control algorithm (formula 11), and the constraints are also the same, namely, formulas (12) to (21). The collision avoidance shared control method is basically the same as the virtual collision avoidance control algorithm (formula 11), but there are two differences. Firstly, the collision avoidance reference trajectory is no longer the parameterized candidate nominal collision avoidance trajectory $r_A^{(N_o)}(k)$, but the optimal nominal collision avoidance trajectory $r_A(k)$ that is finally selected according to risk optimization. In addition, an error between the system control input sequence and the driver's current input $u_D(k)$ is added to the cost function and punished by the weight coefficient $R_D^{(o)}$. The cost function makes the optimal control sequence of the system conform to the currently observed driver's steering angle input $u_D(k)$ to some extent. That is, very conservative zero-order prediction is performed on the driver's behavior. Assuming that the driver's steering wheel angle remains constant in the predicted time domain and does not cause safety constraint breach of the vehicle, the optimized control sequence for the system may be equal to the driver's current input. The weight coefficient $R_D^{(o)}$ in fact implicitly represents the control right of the driver. Where $R_D^{(o)}=0$, the current input of the driver may not be considered when the system performs rolling optimization solution, which is equivalent to the system performing fully autonomous collision avoidance control. Where $R_D^{(0)} \to \infty$, the rolling optimization result of the system may infinitely approach the current steering wheel angle of the driver, which is equivalent to the vehicle being completely operated by the driver for collision avoidance. In practice, the implicit control right RIO may be linked to the risk assessment value at the start of collision avoidance. Where the current overall risk is small, the driver is given a sufficient control right to avoid the obstacle ahead, and reduce the operator's intervention and invasiveness. Where the overall risk of the system is great at the start of collision avoidance, the system deprives the driver's control right as much as possible to ensure the stability and safety of the collision avoidance process.

The present disclosure thus far completes integrated risk assessment based on nominal collision avoidance trajectory optimization and risk intervention-based forward collision avoidance shared control based on a shared autonomy mode of an autonomous vehicle in a forward collision avoidance scenario.

The present disclosure is based on a model predictive control framework to achieve vehicle risk full-time controllability and safe and stable collision avoidance in a shared autonomy mode by performing vehicle risk comprehensive assessment and early intervention. The present disclosure includes an integrated risk assessment method based on nominal collision avoidance trajectory optimization and a risk intervention-based forward collision avoidance shared control method. The comprehensive risk assessment method based on nominal collision avoidance trajectory optimization is to solve the optimal predictive control sequence based on the linear vehicle model, and use the nonlinear model to predict and assess the vehicle state under the optimal predictive control sequence. The method takes into account the computational efficiency of the linear model predictive control and the accuracy of the risk assessment based on the nonlinear model. The risk intervention-based forward collision avoidance shared control method takes the driver's real-time input into consideration, incorporates the driver's steering wheel angle input into the forward collision avoidance shared control, ensures that the driver's control intention is respected to some extent, and gives the driver enough control power to avoid the forward obstacle when the overall risk is small, reduces the driver's operation intervention and invasiveness, and deprives the driver's control power to ensure the stability and safety of the collision avoidance process when the overall risk is large.

According to the embodiments of the present disclosure, the intervention-based shared control method in the forward collision avoidance scenario of the autonomous vehicle provides a comprehensive risk assessment method and a collision avoidance intervention policy in a high-velocity forward collision avoidance scenario. With respect to shared autonomy high-velocity forward collision avoidance scenarios, the solutions according to the present disclosure make a breakthrough out of the minimum intervention principle, and introduce the nominal collision avoidance reference trajectories, such that the collision risks of the vehicle during collision avoidance are further reduced. A vehicle model decoupling method integrating control solution and risk prediction is provided, such that solution efficiency of linear models and prediction accuracy of nonlinear models are both considered. The nominal collision avoidance trajectory optimization and the comprehensive risk assessment are unified under the model predictive control framework, such that advance risk assessment in the forward collision avoidance scenario is implemented, and judgment issues related to critical collision avoidance intervention chances are addressed. In summary, the present disclosure has constructed the collision avoidance intervention control policy that implicitly representing the driver control right, and provides double safety insurance "collision-loss of stability" in the high-velocity forward collision avoidance scenario for shared autonomy.

Figure 4:
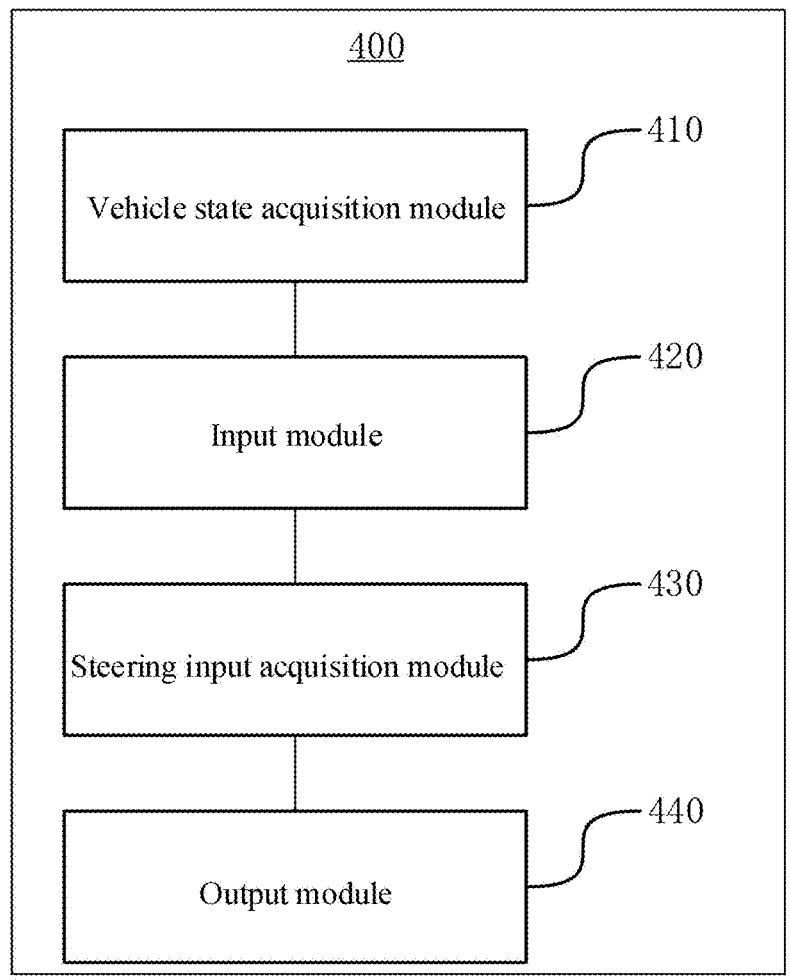
FIG. 4 is a schematic block diagram of an intervention-based shared control apparatus in a forward collision avoidance scenario of an autonomous vehicle according to an embodiment of the present disclosure.

As illustrated in FIG. 4, an embodiment of the present disclosure provides an intervention-based shared control apparatus 400 in a forward collision avoidance scenario of an autonomous vehicle. The apparatus 400 is applied in performing an intervention-based shared control method in a forward collision avoidance scenario of an autonomous vehicle. The apparatus 400 includes: a vehicle state acquisition module 410, an input module 420, a steering input acquisition module 430, and an output module 440.

The vehicle state acquisition module 410 is configured to acquire vehicle state data of the autonomous vehicle.

The input module 420 is configured to input the vehicle state data into a constructed forward collision avoidance control model based on a virtual collision avoidance control algorithm to obtain an optimal nominal collision avoidance trajectory of the autonomous vehicle.

The steering input acquisition module 430 is configured to acquire steering input data of a driver in controlling the autonomous vehicle.

The output module 440 is configured to obtain the shared control method in the forward collision avoidance scenario of the autonomous vehicle based on the optimal nominal collision avoidance trajectory, the steering input data, and the virtual collision avoidance control algorithm.

Optionally, the input module 420 is further configured to:
acquire history experience data in forward collision avoidance scenarios, and establish the forward collision avoidance scenario of the autonomous vehicle based on the history experience data;
generate, by sampling, a plurality of candidate nominal collision avoidance trajectories based on the forward collision avoidance scenario of the autonomous vehicle;
generate an optimal control sequence for each of the plurality of candidate nominal collision avoidance trajectories;
perform vehicle state trajectory prediction on the optimal control sequence using a nonlinear vehicle dynamics model to obtain a vehicle state trajectory; and
perform risk assessment on the vehicle state trajectory using a risk assessment algorithm to obtain the optimal nominal collision avoidance trajectory of the autonomous vehicle.

Optionally, the input module 420 is further configured to:
use a collision avoidance completion time in the forward collision avoidance scenario of the autonomous vehicle as a parameter;
sample the parameter to obtain a sampling result; and
generate the plurality of candidate nominal collision avoidance trajectories based on the sampling result and a numerical optimization method.

Optionally, the input module 420 is further configured to:
generate the optimal control sequence for each of the plurality of candidate nominal collision avoidance trajectories based on predetermined safety constraints and the virtual collision avoidance control algorithm.

Optionally, the predetermined safety constraints include a collision safety constraint and a stability safety constraint.

Optionally, the input module 420 is further configured to:
construct a nonlinear tire model, wherein the nonlinear tire model is used to describe a tire cornering characteristic of the autonomous vehicle;
construct a nonlinear vehicle dynamics equation, wherein the nonlinear vehicle dynamics equation is used to describe dynamics of the autonomous vehicle;
obtain the nonlinear vehicle dynamics model based on the nonlinear tire model, the nonlinear vehicle dynamics equation, and a tire cornering angle estimation formula; and
discretize the nonlinear vehicle dynamics model using four-order Runge-Kutta method, and perform the vehicle state trajectory prediction on the optimal control sequence to obtain a vehicle state trajectory corresponding to each of the plurality of candidate nominal collision avoidance trajectories.

Optionally, the output module 440 is further configured to:
construct a forward collision avoidance shared control algorithm based on the optimal nominal collision avoidance trajectory, the steering input data, and the virtual collision avoidance control algorithm;
obtain an optimal shared control sequence of the optimal nominal collision avoidance trajectory based on the forward collision avoidance shared control algorithm; and
obtain the shared control method in the forward collision avoidance scenario of the autonomous vehicle based on the steering input data, the optimal shared control sequence, and the predetermined safety constraint.

According to the embodiments of the present disclosure, the intervention-based shared control method in the forward collision avoidance scenario of the autonomous vehicle provides a comprehensive risk assessment method and a collision avoidance intervention policy in a high-velocity forward collision avoidance scenario. With respect to shared autonomy high-velocity forward collision avoidance scenarios, the solutions according to the present disclosure make a breakthrough out of the minimum intervention principle, and introduce the nominal collision avoidance reference trajectories, such that the collision risks of the vehicle during collision avoidance are further reduced. A vehicle model decoupling method integrating control solution and risk prediction is provided, such that solution efficiency of linear models and prediction accuracy of nonlinear models are both considered. The nominal collision avoidance trajectory optimization and the comprehensive risk assessment are unified under the model predictive control framework, such that advance risk assessment in the forward collision avoidance scenario is implemented, and judgment issues related to critical collision avoidance intervention chances are addressed. In summary, the present disclosure has constructed the collision avoidance intervention control policy that implicitly representing the driver control right, and provides double safety insurance "collision-loss of stability" in the high-velocity forward collision avoidance scenario for shared autonomy.

Figure 5:
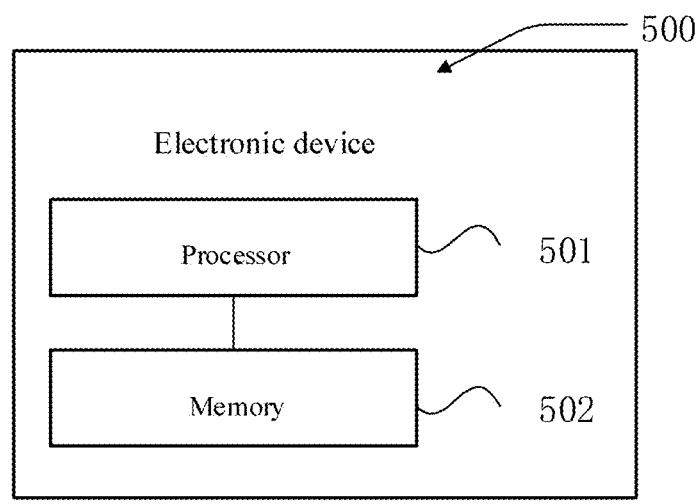
FIG. 5 is a schematic structural diagram of an electronic device according to an embodiment of the present disclosure.

FIG. 5 is a schematic structural diagram of an electronic device 500 according to an embodiment of the present disclosure. The electronic device 500 may greatly vary due to different configurations or performance, and may include one or more central processing units (CPUs) 501 and one or more memories 502. The memory 502 stores at least one instruction, wherein the at least one instruction, when being loaded and executed by the processor 501, may cause the processor 501 to perform an intervention-based shared control method in the forward collision avoidance scenario of the autonomous vehicle hereinafter. The method includes the following steps.

In S1, vehicle state data of the autonomous vehicle is acquired.

In S2, the vehicle state data is input into a constructed forward collision avoidance control model based on a virtual collision avoidance control algorithm to obtain an optimal nominal collision avoidance trajectory of the autonomous vehicle.

In S3, steering input data of a driver in controlling the autonomous vehicle is acquired.

In S4, the shared control method in the forward collision avoidance scenario of the autonomous vehicle is obtained based on the optimal nominal collision avoidance trajectory, the steering input data, and the virtual collision avoidance control algorithm.

An exemplary embodiment further provides a computer-readable storage medium storing one or more instructions, for example, a memory including one or more instructions. The one or more instructions, when loaded and executed by a processor of a terminal, cause the terminal to perform the intervention-based shared control method in the forward collision avoidance scenario of the autonomous vehicle. For example, the computer-readable storage medium may be a read-only memory (ROM), a random access memory (RAM), a compact disc ROM (CD-ROM), a magnetic tape, a floppy disk, an optical data storage device, or the like.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. An intervention-based shared control method in a forward collision avoidance scenario of an autonomous vehicle, comprising:
   S1, acquiring vehicle state data of the autonomous vehicle;
   S2, inputting the vehicle state data into a constructed forward collision avoidance control model based on a virtual collision avoidance control algorithm to obtain an optimal nominal collision avoidance trajectory of the autonomous vehicle;
   S3, acquiring steering input data of a driver in controlling the autonomous vehicle; and
   S4, obtaining the shared control method in the forward collision avoidance scenario of the autonomous vehicle based on the optimal nominal collision avoidance trajectory, the steering input data, and the virtual collision avoidance control algorithm;
   constructing the forward collision avoidance control model based on the virtual collision avoidance control algorithm in S2 comprises:
   S21, acquiring history experience data in forward collision avoidance scenarios, and establishing the forward collision avoidance scenario of the autonomous vehicle based on the history experience data;
   S22, generating, by sampling, a plurality of candidate nominal collision avoidance trajectories based on the forward collision avoidance scenario of the autonomous vehicle, wherein the plurality of candidate nominal collision avoidance trajectories comprise a series expected lateral displacements to be reached in the future, and at each instant, the lateral displacement is planned by performing equal-interval sampling towards a forward direction based on a current vehicle state and a current vehicle velocity and a control sampling period, and different steps for lane-change collision avoidance correspond to different candidate nominal collision avoidance trajectories;
   S23, generating an optimal control sequence for each of the plurality of candidate nominal collision avoidance trajectories based on predetermined safety constraints and the virtual collision avoidance control algorithm, wherein the predetermined safety constraints comprise a collision safety constraint and a stability safety constraint, and the collision safety constraint is greater than or equal to a sum of a lower boundary of a travel region of the autonomous vehicle and a buffer area width defined in consideration of a vehicle dimension and is less than or equal to a sum of an upper boundary of the travel region of the autonomous vehicle and the buffer area width defined in consideration of the vehicle dimension, and the stability safety constraint is constrained into a linear area range of a tire cornering angle;
   S24, performing vehicle state trajectory prediction on the optimal control sequence using a nonlinear vehicle dynamics model to obtain a vehicle state trajectory; and
   S25, performing risk assessment on the vehicle state trajectory using a risk assessment algorithm to obtain the optimal nominal collision avoidance trajectory of the autonomous vehicle.

2. The intervention-based shared control method according to claim 1, wherein generating, by sampling, the plurality of candidate nominal collision avoidance trajectories based on the forward collision avoidance scenario of the autonomous vehicle in S22 comprises:
   S221, using a collision avoidance completion time in the forward collision avoidance scenario of the autonomous vehicle as a parameter;
   S222, sampling the parameter to obtain a sampling result; and
   S223, generating the plurality of candidate nominal collision avoidance trajectories based on the sampling result and a numerical optimization method.

3. The intervention-based shared control method according to claim 1, wherein performing the vehicle state trajectory prediction on the optimal control sequence using the nonlinear vehicle dynamics model to obtain the vehicle state trajectory in S24 comprises:
  S241, constructing a nonlinear tire model, wherein the nonlinear tire model is used to describe a tire cornering characteristic of the autonomous vehicle;
  S242, constructing a nonlinear vehicle dynamics equation, wherein the nonlinear vehicle dynamics equation is used to describe dynamics of the autonomous vehicle;
  S243, obtaining the nonlinear vehicle dynamics model based on the nonlinear tire model, the nonlinear vehicle dynamics equation, and a tire cornering angle estimation formula; and
  S244, discretizing the nonlinear vehicle dynamics model using four-order Runge-Kutta method, and performing the vehicle state trajectory prediction on the optimal control sequence to obtain a vehicle state trajectory corresponding to each of the plurality of candidate nominal collision avoidance trajectories.

4. The intervention-based shared control method according to claim 1, wherein obtaining the shared control method in the forward collision avoidance scenario of the autonomous vehicle based on the optimal nominal collision avoidance trajectory, the steering input data, and the virtual collision avoidance control algorithm in S4 comprises:
  S41, constructing a forward collision avoidance shared control algorithm based on the optimal nominal collision avoidance trajectory, the steering input data, and the virtual collision avoidance control algorithm;
  S42, obtaining an optimal shared control sequence of the optimal nominal collision avoidance trajectory based on the forward collision avoidance shared control algorithm; and
  S43, obtaining the shared control method in the forward collision avoidance scenario of the autonomous vehicle based on the steering input data, the optimal shared control sequence, and the predetermined safety constraint.

5. An intervention-based shared control apparatus in a forward collision avoidance scenario of an autonomous vehicle, comprising:
  a vehicle state acquisition module, configured to acquire vehicle state data of the autonomous vehicle;
  an input module, configured to input the vehicle state data into a constructed forward collision avoidance control model based on a virtual collision avoidance control algorithm to obtain an optimal nominal collision avoidance trajectory of the autonomous vehicle;
  a steering input acquisition module, configured to acquire steering input data of a driver in controlling the autonomous vehicle; and
  an output module, configured to obtain the shared control method in the forward collision avoidance scenario of the autonomous vehicle based on the optimal nominal collision avoidance trajectory, the steering input data, and the virtual collision avoidance control algorithm;
  the input module is further configured to:
  acquire history experience data in forward collision avoidance scenarios, and establish the forward collision avoidance scenario of the autonomous vehicle based on the history experience data;
  generate, by sampling, a plurality of candidate nominal collision avoidance trajectories based on the forward collision avoidance scenario of the autonomous vehicle, wherein the plurality of candidate nominal collision avoidance trajectories comprise a series expected lateral displacements to be reached in the future, and at each instant, the lateral displacement is planned by performing equal-interval sampling towards a forward direction based on a current vehicle state and a current vehicle velocity and a control sampling period, and different steps for lane-change collision avoidance correspond to different candidate nominal collision avoidance trajectories;
  generate an optimal control sequence for each of the plurality of candidate nominal collision avoidance trajectories, based on predetermined safety constraints and the virtual collision avoidance control algorithm, wherein the predetermined safety constraints comprise a collision safety constraint and a stability safety constraint, and the collision safety constraint is greater than or equal to a sum of a lower boundary of a travel region of the autonomous vehicle and a buffer area width defined in consideration of a vehicle dimension and is less than or equal to a sum of an upper boundary of the travel region of the autonomous vehicle and the buffer area width defined in consideration of the vehicle dimension, and the stability safety constraint is constrained into a linear area range of a tire cornering angle;
  perform vehicle state trajectory prediction on the optimal control sequence using a nonlinear vehicle dynamics model to obtain a vehicle state trajectory; and
  perform risk assessment on the vehicle state trajectory using a risk assessment algorithm to obtain the optimal nominal collision avoidance trajectory of the autonomous vehicle.

6. The intervention-based shared control apparatus according to claim 5, wherein the output module is further configured to:
  construct a forward collision avoidance shared control algorithm based on the optimal nominal collision avoidance trajectory, the steering input data, and the virtual collision avoidance control algorithm;
  obtain an optimal shared control sequence of the optimal nominal collision avoidance trajectory based on the forward collision avoidance shared control algorithm; and
  obtain the shared control method in the forward collision avoidance scenario of the autonomous vehicle based on the steering input data, the optimal shared control sequence, and the predetermined safety constraint.

* * * * *